(12) United States Patent
Doddamani et al.

(10) Patent No.: US 11,436,442 B2
(45) Date of Patent: Sep. 6, 2022

(54) ELECTRONIC APPARATUS AND CONTROL METHOD THEREOF

(71) Applicant: Samsung Electronics Co., Ltd., Suwon-si (KR)

(72) Inventors: Jagannathrao Doddamani, Suwon-si (KR); Wooseok Kang, Suwon-si (KR); Doohyun Kim, Suwon-si (KR); Kiwon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/829,178

(22) Filed: Mar. 25, 2020

(65) Prior Publication Data
US 2021/0158103 A1 May 27, 2021

(30) Foreign Application Priority Data

Nov. 21, 2019 (KR) .................. 10-2019-0150767

(51) Int. Cl.
| | | |
|---|---|---|
| *G06K 9/62* | (2022.01) | |
| *G06N 3/04* | (2006.01) | |
| *G06T 5/20* | (2006.01) | |
| *G06T 3/40* | (2006.01) | |
| *G06N 3/08* | (2006.01) | |

(52) U.S. Cl.
CPC ............ *G06K 9/6262* (2013.01); *G06N 3/04* (2013.01); *G06N 3/08* (2013.01); *G06T 3/4053* (2013.01); *G06T 5/20* (2013.01)

(58) Field of Classification Search
None
See application file for complete search history.

(56) References Cited

U.S. PATENT DOCUMENTS

| | | |
|---|---|---|
| 9,904,874 B2 | 2/2018 | Shoaib et al. |
| 10,083,375 B1 | 9/2018 | Kim et al. |

(Continued)

FOREIGN PATENT DOCUMENTS

| | | |
|---|---|---|
| CN | 107508866 | 12/2017 |
| CN | 107508866 A * | 12/2017 |

(Continued)

OTHER PUBLICATIONS

D. Lee et al., "On-chip memory reduction in CNN hardware design for image super-resolution", Seoul University, Feb. 2019 [http://s-space.snu.ac.kr/handle/10371/151952], 118 pages w/ an Abstract (3 pages).

(Continued)

*Primary Examiner* — Jiangeng Sun
(74) *Attorney, Agent, or Firm* — Nixon & Vanderhye P.C.

(57) ABSTRACT

An electronic apparatus is provided. The electronic apparatus includes: a memory storing information on an artificial intelligence model including a plurality of layers, and a processor configured to acquire an output image based on processing an input image using the artificial intelligence model. The processor is configured to: identify whether a parameter used in any one layer among the plurality of layers is a fixed parameter or a variable parameter, and provide the parameter to a first operation module or a second operation module included in of the artificial intelligence model of the artificial intelligence model any one layer based on the identification and perform an operation between output data of a previous layer and the parameter.

20 Claims, 11 Drawing Sheets

(56) References Cited

U.S. PATENT DOCUMENTS

| | | |
|---|---|---|
| 10,586,149 B2 | 3/2020 | Kato et al. |
| 2018/0107925 A1 | 4/2018 | Choi et al. |
| 2018/0189667 A1 | 7/2018 | Tsou et al. |
| 2018/0204118 A1 | 7/2018 | Ono |
| 2019/0095212 A1 | 3/2019 | Yang |
| 2019/0147325 A1 | 5/2019 | Martin |
| 2019/0171926 A1 | 6/2019 | Chen et al. |
| 2020/0394523 A1* | 12/2020 | Liu .................. G06F 17/18 |

FOREIGN PATENT DOCUMENTS

| | | | |
|---|---|---|---|
| CN | 108734267 A | * 11/2018 | |
| CN | 109102067 A | * 12/2018 | |
| JP | 2862337 B2 | 12/1999 | |
| JP | 4552464 | 9/2010 | |
| JP | 6773568 B2 | 10/2020 | |
| JP | 6945986 B2 | 10/2021 | |
| KR | 10-2018-0043154 | 4/2018 | |
| KR | 10-2019-0036317 | 4/2019 | |
| KR | 10-2019-0041921 A | 4/2019 | |
| KR | 10-2019-0109820 | 9/2019 | |
| WO | WO-2021022903 A1 * | 2/2021 | ............... G06N 3/04 |

OTHER PUBLICATIONS

International Search Report and Written Opinion dated Aug. 14, 2020 in corresponding International Application No. PCT/KR2020/004998.

* cited by examiner

ELECTRONIC APPARATUS AND CONTROL METHOD THEREOF

CROSS-REFERENCE TO RELATED APPLICATION

This application is based on and claims priority under 35 U.S.C. § 119 to Korean patent application number 10-2019-0150767, filed on Nov. 21, 2019 in the Korean Intellectual Property Office, the disclosure of which is incorporated by reference herein in its entirety.

BACKGROUND

1. Field

The disclosure relates to an electronic apparatus and a control method thereof, and for example, to an electronic apparatus performing image processing using an artificial intelligence model, and a control method thereof.

2. Description of Related Art

Spurred by the development of electronic technologies, various types of electronic apparatuses are being developed and distributed. In particular, display apparatuses used in various places such as homes, offices, and public spaces are being continuously developed in a recent few years.

Recently, there is a greatly increasing demand for high resolution image services. Because of such a demand, deep learning-based technologies such as super resolution, style transfer, etc. are being used in image processing.

Super resolution may refer, for example, to a technology of restoring an input image of a low resolution to an image of a high resolution through a series of media processing. For example, an input image of a low resolution may be scaled in horizontal/vertical directions using a CNN model including a plurality of deep learning-based layers, and restored to an image of a high resolution. The number of layers of neurons of a neural network in such a CNN model and the kinds of convolution filters in accordance thereto reaches dozens. For an operation of convolution filters, multipliers are used, and in case a large number of multipliers are needed, there is a problem that there is a burden on the size of hardware, the cost, and power consumption.

SUMMARY

An electronic apparatus according to an example embodiment of the disclosure for achieving the aforementioned purpose includes: a memory storing information on an artificial intelligence model including a plurality of layers, and a processor configured to acquire an output image based processing an input image using the artificial intelligence model. The processor may be configured to identify whether a parameter used in any one layer among the plurality of layers included in the artificial intelligence model is a fixed parameter or a variable parameter, and provide the parameter to a first operation module or a second operation module included in the any one layer of the artificial intelligence model based on the identification result and perform an operation between output data of a previous layer and the parameter.

A control method of an electronic apparatus storing information on an artificial intelligence model including a plurality of layers according to an example embodiment of the disclosure includes: identifying whether a parameter used in any one layer among the plurality of layers included in the artificial intelligence model is a fixed parameter or a variable parameter, and providing the parameter to a first operation module or a second operation module included in the any one layer of the artificial intelligence model based on the identification result and performing an operation between output data of a previous layer and the parameter.

According to another example embodiment, a non-transitory computer-readable medium is provided, the medium storing computer instructions which, when executed by a processor of an electronic apparatus storing information on an artificial intelligence model including a plurality of layers, cause the electronic apparatus perform operations comprising: identifying whether a parameter used in any one layer among the plurality of layers included in the artificial intelligence model is a fixed parameter or a variable parameter, and providing the parameter to a first operation module or a second operation module included in the any one layer of the artificial intelligence model based on the identification result and performing an operation between output data of a previous layer and the parameter.

BRIEF DESCRIPTION OF THE DRAWINGS

The above and other aspects, features and advantages of certain embodiments of the present disclosure will be more apparent from the following detailed description, taken in conjunction with the accompanying drawing, in which.

DETAILED DESCRIPTION

Figure 1A:
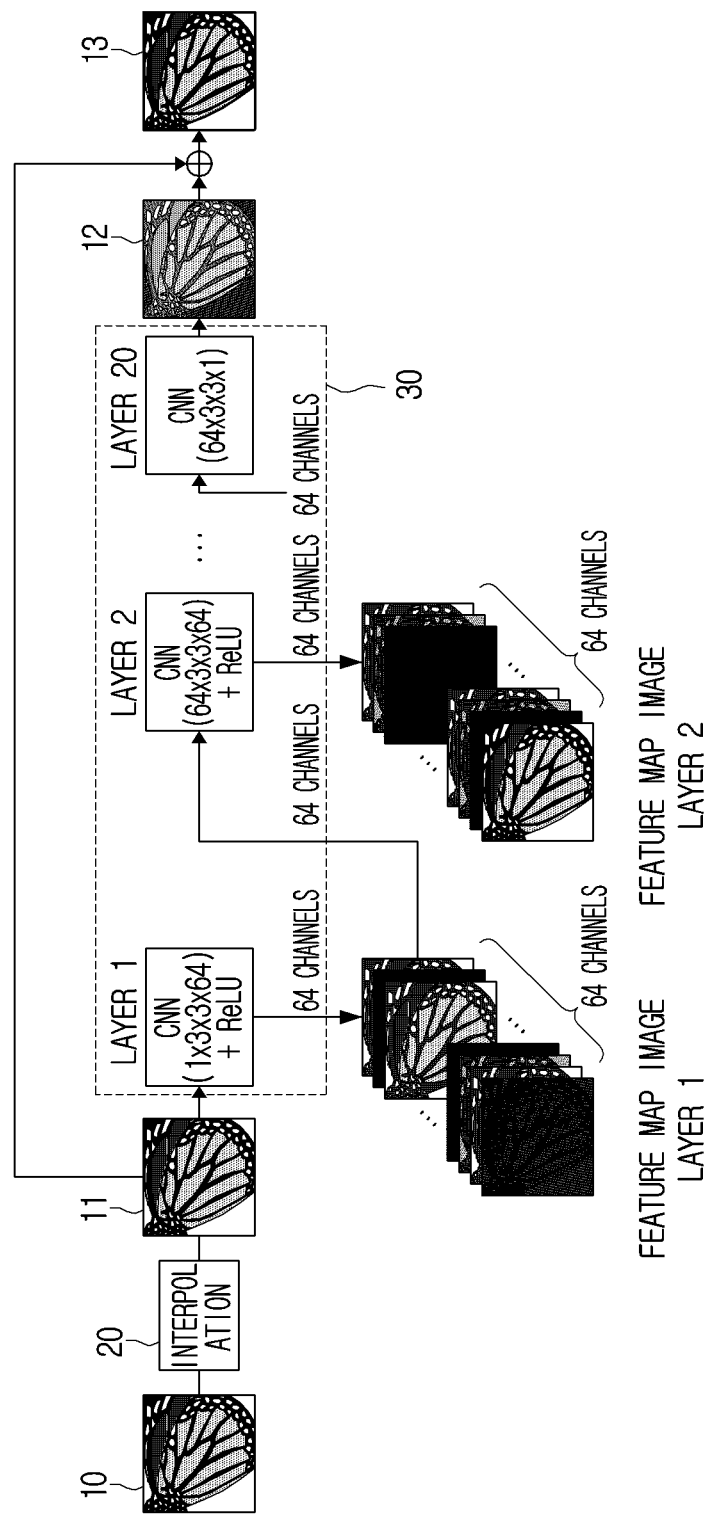
FIG. 1A is a diagram illustrating an example image processing operation of an electronic apparatus according to an embodiment of the disclosure.

The disclosure addresses the aforementioned need, and the disclosure provides an electronic apparatus for implementing an operation module for a neural network operation with little hardware resource, and a control method thereof.

Hereinafter, the disclosure will be described in greater detail with reference to the accompanying drawings.

The terms used in this disclosure will be described briefly, and then the disclosure will be described in greater detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions or emergence of new technologies. Also, in some cases, there may be terms that arbitrarily selected, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Terms such as "first," "second" and the like may be used to describe various components, but the components are not intended to be limited by the terms. The terms are used to distinguish one component from another component.

Singular expressions also include plural expressions as long as they do not conflict with the context. In addition, in this disclosure, terms such as "include" and "consist of" should be understood as designating that there are such characteristics, numbers, steps, operations, elements, components or a combination thereof described in the disclosure, but not to exclude in advance the existence or possibility of adding one or more of other characteristics, numbers, steps, operations, elements, components or a combination thereof.

Also, the expression "at least one of A or B" should be interpreted to mean any one of "A" or "B" or "A and B."

In the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

Hereinafter, the various example embodiments of the disclosure will be described in greater detail with reference to the accompanying drawings. However, it should be noted that the disclosure may be implemented in various different forms, and is not limited to the embodiments described herein. Also, in the drawings, parts that are not related to explanation may be omitted, for explaining the disclosure clearly, and throughout the disclosure, similar components may be designated by similar reference numerals.

FIG. 1A is a diagram illustrating an example image processing operation of an electronic apparatus according to an embodiment of the disclosure.

An electronic apparatus according to an embodiment of the disclosure may be implemented to perform image processing for an input image using an artificial intelligence model (or a neural network model or a learning network model). An artificial intelligence model may include a plurality of neural network layers. Each of the plurality of neural network layers may include a plurality of parameters (or a plurality of weight values), and perform a neural network operation through an operation result of the previous layer and an operation among the plurality of parameters. The parameters included in the plurality of neural network layers may be optimized by a learning result of the artificial intelligence model. For example, parameters may be updated such that a loss value or a cost value acquired at the artificial intelligence model during a learning process is reduced or minimized. An artificial neural network may include, for example, and without limitation, a deep neural network (DNN), and as examples thereof, there are a convolutional neural network (CNN), a recurrent neural network (RNN), a restricted Boltzmann machine (RBM), a deep belief network (DBN), a bidirectional recurrent deep neural network (BRDNN), deep Q-networks, or the like, but a neural network is not limited to the aforementioned examples.

FIG. 1A illustrates an example of an artificial intelligence model for super resolution processing according to an embodiment of the disclosure. Super resolution may refer, for example, to processing of converting an image having a low resolution into a high resolution through a series of media processing.

According to FIG. 1A, the electronic apparatus according to an embodiment of the disclosure may perform interpolation processing 20 for an input image 10, e.g., an image of a low resolution, and input an image 11 for which interpolation processing was performed into the artificial intelligence model 30 and acquire a residual image 12. For example, the artificial intelligence model 30 may be implemented as a residual neural network.

The electronic apparatus may combine the image 11 for which interpolation processing was performed with the residual image 12 and acquire an output image 13, e.g., an image of a high resolution. Interpolation processing may refer, for example, to processing of scaling an image of a low resolution to a high resolution, and may include, for example, and without limitation, at least one interpolation technique among bilinear interpolation, nearest neighbor interpolation, bicubic interpolation, deconvolution interpolation, subpixel convolution interpolation, polyphase interpolation, trilinear interpolation, linear interpolation, or the like. A residual image may refer, for example, to an image including only residual information. Residual information may include information according to a difference between an input image and a reference image, and may include, for example, and without limitation, at least one of an edge direction, edge strength, noise information, texture information, or the like, but is not limited thereto. According to another embodiment of the disclosure, residual information may include, for example, and without limitation, at least one of gray scale information, brightness information, gamma information, or the like.

Figure 1B:
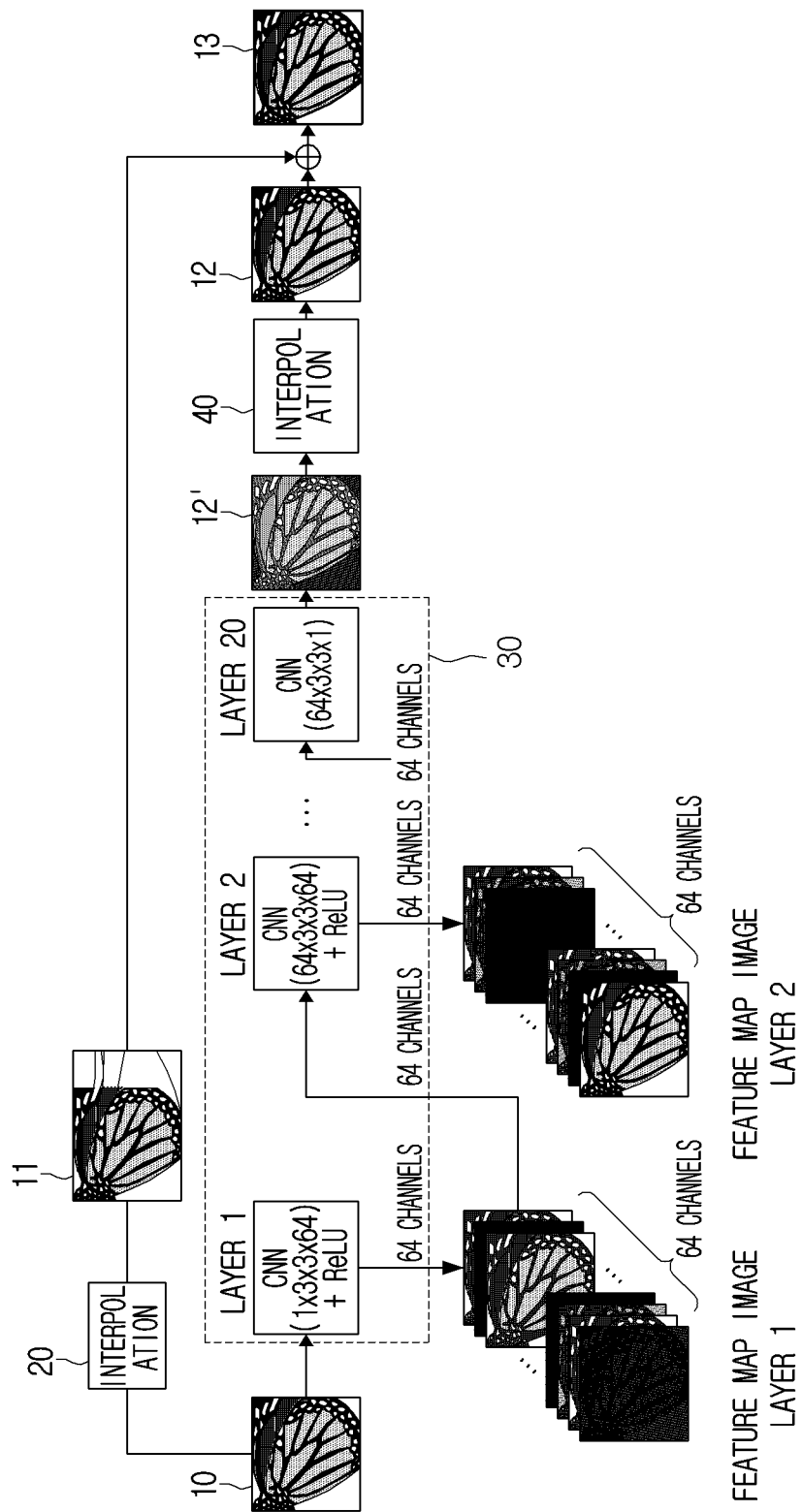
FIG. 1B is a diagram illustrating an example of an artificial intelligence model for super resolution processing according to another embodiment of the disclosure.

FIG. 1B is a diagram illustrating an example of an artificial intelligence model for super resolution processing according to another embodiment of the disclosure.

According to FIG. 1B, the electronic apparatus may input an input image 10, e.g., an image of a low resolution into the artificial intelligence model 30 and acquire a residual image 12', and perform interpolation processing 40 on the residual image 12' and acquire a residual image 12 for which interpolation processing was performed. The electronic apparatus may perform interpolation processing 20 on the input image 10 and acquire an image 11 for which interpolation processing was performed. The electronic apparatus may combine the image 11 for which interpolation processing was performed with the residual image 12 for which interpolation processing was performed and acquire an output image 13, e.g., an image of a high resolution. For example, according to the embodiment illustrated in FIG. 1B, the residual image 12' may be acquired by inputting the input image 10 into the artificial intelligence model 30 unlike the embodiment illustrated in FIG. 1A.

The artificial intelligence model 30 used for super resolution processing illustrated in FIGS. 1A and 1B may have been made through learning. The feature that the artificial intelligence model 30 is made through learning may refer, for example, to a basic artificial intelligence model being trained using a plurality of learning data by a learning algorithm, and accordingly, a pre-defined operation rule or an artificial intelligence model set to perform a desired characteristic (or, purpose) is made. Such learning may be performed through a separate server and/or system according to the disclosure, but is not limited thereto, and may be performed at an electronic apparatus. As examples of learning algorithms, there may be, for example, and without limitation, supervised learning, unsupervised learning, semi-supervised learning, reinforcement learning, or the like, but learning algorithms are not limited to the aforementioned examples.

For the artificial intelligence model 30, for example, a CNN-based VDSR technology (Jiwon Kim, et al., Accurate Image Super-Resolution Using Very Deep Convolutional Networks, CVPR 2016), EDSR (Enhanced Deep Residual Networks for Single Image Super-Resolution), DRCN ("Deeply-Recursive Convolutional Network for Image Super-Resolution." Proceedings of the IEEE Conference on Computer Vision and Pattern Recognition. 2016), MDSR (Multi-scale deep super-resolution system), etc. may be used, but the disclosure is not limited thereto.

As described above, each of the plurality of neural network layers included in the artificial intelligence model 30 may include a plurality of parameters, and the artificial intelligence model 30 may perform a neural network operation through an operation result of the previous layer and an operation among the plurality of parameters.

Figure 1C:
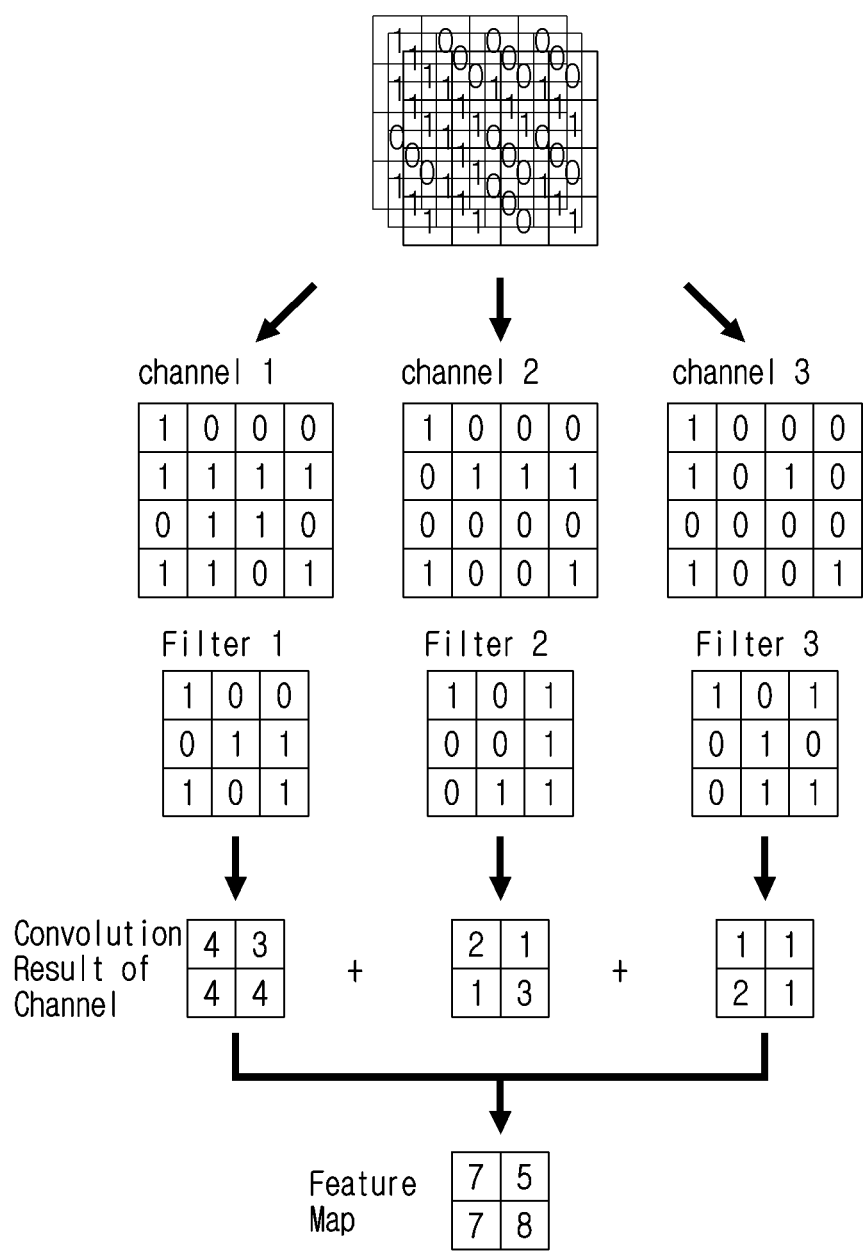
FIG. 1C is a diagram illustrating example operation processing of a random layer according to an embodiment of the disclosure.

FIG. 1C is a diagram illustrating example operation processing of a random layer according to an embodiment of the disclosure.

According to an embodiment of the disclosure, neural network operation processing may be performed in a random layer. For example, each convolution layer included in a convolutional neural network (CNN) may apply at least one filter (or kernel) for input data. If filters in the number of n are applied in a random convolution layer, output data may have channels in the n number. For example, the filters may be in the form of n*n. For example, as illustrated in FIG. 1C, in case three filters in the form of 3*3 are applied in a specific convolution layer, the number of channels of output data may be three.

In general, a convolution filter operation for application of each filter is performed for an entire input image, and a few at the minimum and tens or hundreds at the maximum of different convolution filter operations may be performed for the same input image in a random layer. Also, the number of layers constituting a neural network may reach tens, and each layer is also processed according to tens of different convolution filter coefficients. Thus, a great number of multipliers for convolution operations are needed.

Accordingly, in the disclosure, various embodiments wherein the cost and power can be effectively reduced by reducing the size of hardware by simplifying a multiplier operator for a convolution operation will be described.

Figure 2:
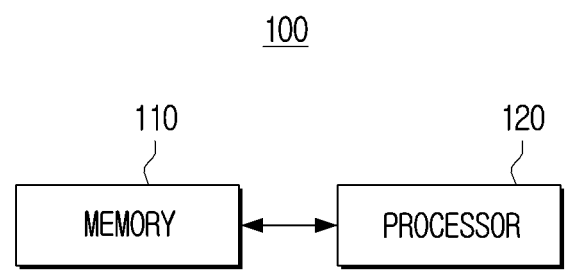
FIG. 2 is a block diagram illustrating an example configuration of an example electronic apparatus according to an embodiment of the disclosure.

FIG. 2 is a block diagram illustrating an example configuration of an example electronic apparatus according to an embodiment of the disclosure.

According to FIG. 2, the electronic apparatus 100 includes a memory 110 and a processor (e.g., including processing circuitry) 120.

The electronic apparatus 100 may be implemented, for example, and without limitation, as a TV, a set-top box, or the like, for which real-time image processing is needed. However, the electronic apparatus 100 is not limited thereto, and may be implemented, for example, and without limitation, as a smartphone, a tablet PC, a laptop PC, a head mounted display (HMD), a near eye display (NED), a large format display (LFD), digital signage, a digital information display (DID), a video wall, a projector display, a camera, a camcorder, a printer, a server, etc. The electronic apparatus 100 may be a system including a clouding computing environment. The electronic apparatus 100 is not limited thereto, and any apparatus that processes data using an artificial intelligence model can be applied without limitation.

According to an embodiment of the disclosure, the electronic apparatus 100 may receive various compressed images or images of various resolutions. For example, the image processing apparatus 100 may receive images in compressed forms such as, for example, and without limitation, moving picture experts group (MPEG) (e.g., MP2, MP4, MP7, etc.), joint photographic coding experts group (JPEG), advanced video coding (AVC), H.264, H.265, high efficiency video codec (HEVC), etc. The image processing apparatus 100 may receive any one image among, for example, and without limitation, standard definition (SD), high definition (HD), full HD, ultra HD images, or the like.

The memory 110 may store necessary data for the various embodiments of the disclosure. The memory 110 may be implemented in the form of a memory embedded in the electronic apparatus 100, or in the form of a memory that can be attached to or detached from the electronic apparatus 100 according to the use of stored data. For example, in the case of data for operating the electronic apparatus 100, the data may be stored in a memory embedded in the electronic apparatus 100, and in the case of data for an extension function of the electronic apparatus 100, the data may be stored in a memory that can be attached to or detached from the electronic apparatus 100. In the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to and detached from the electronic apparatus 100, the memory may be implemented in a form such as a memory card (e.g., compact flash (CF), secure digital (SD), micro secure digital (Micro-SD), mini secure digital (Mini-SD), extreme digital (xD), a multi-media card (MMC), etc.) and an external memory that can be connected to a USB port (e.g., a USB memory), etc.

According to an embodiment of the disclosure, the memory 110 may store at least one instruction or a computer program including instructions for controlling the electronic apparatus 100.

According to another embodiment of the disclosure, the memory 110 may store information on an artificial intelligence model including a plurality of layers. The feature of storing information on an artificial intelligence model may refer, for example, to storing various kinds of information related to the operation of the artificial intelligence model, for example, information on a plurality of layers included in the artificial intelligence model, information on parameters, biases, etc. used in each of the plurality of layers, and the like. According to an embodiment of the disclosure, information on an artificial intelligence model may include information on parameters used in each of a plurality of layers and identification information indicating whether a parameter is a fixed parameter or a variable parameter. According to implementation forms of the processor 120 that will be described below, information on an artificial intelligence model may be stored in an internal memory of the processor 120. For example, in case the processor 120 is implemented as dedicated hardware, information on an artificial intelligence model may be stored in an internal memory of the processor 120.

According to still another embodiment of the disclosure, the memory 110 may store images received from an external apparatus (e.g., a source apparatus), an external storage medium (e.g., a USB), an external server (e.g., a webhard), etc. An image may include a digital moving image, but is not limited thereto.

According to still another embodiment of the disclosure, the memory 110 may store various kinds of image information necessary for image processing, for example, texture information for texture processing, edge information for edge processing, etc. The memory 110 may store a final output image generated by image processing.

According to an embodiment of the disclosure, the memory 110 may be implemented as a single memory storing data generated in various operations according to the disclosure. According to another embodiment of the disclosure, the memory 110 may be implemented to include a plurality of memories.

The processor 120 may include various processing circuitry and may be electrically connected with the memory 110, and may control the overall operations of the electronic apparatus 100. The processor 120 may include one or a plurality of processors. For example, the processor 120 may execute at least one instruction stored in the memory 110, and thereby perform the operations of the electronic apparatus 100 according to the various embodiments of the disclosure.

According to an embodiment of the disclosure, the processor 120 may be implemented, for example, and without limitation, as a digital signal processor (DSP) processing digital image signals, a microprocessor, a graphics processing unit (GPU), an artificial intelligence (AI) processor, a neural processing unit (NPU), a time controller (TCON), or the like. However, the disclosure is not limited thereto, and the processor 120 may include, for example, and without limitation, one or more of a central processing unit (CPU), a dedicated processor, a micro controller unit (MCU), a micro processing unit (MPU), a controller, an application processor (AP), a communication processor (CP), an ARM processor, or the like, or may be defined by the terms. Also, the processor 120 may be implemented as a system on chip (SoC) having a processing algorithm stored therein or large scale integration (LSI), or in the forms of an application specific integrated circuit (ASIC) and a field programmable gate array (FPGA).

The processor 120 for executing an artificial intelligence model according to an embodiment of the disclosure may be a generic-purpose processor such as a CPU, an AP, a digital signal processor (DSP), a graphic-dedicated processor such as a GPU, a vision processing unit (VPU), an artificial intelligence-dedicated processor such as an NPU, or the like. The processor 120 may perform control such that input data is processed according to a pre-defined operation rule or an artificial intelligence model stored in the memory 110. In case the processor 120 is an artificial intelligence-dedicated processor, it may be designed as a hardware structure specialized in processing of a specific artificial intelligence model. For example, hardware specialized in processing of a specific artificial intelligence model may be designed as a hardware chip such as an ASIC and an FPGA.

The processor 120 may process input data and acquire output data. Input data may include, for example, and without limitation, at least one of a text, an image, a user voice, or the like. For example, input data may be input through a communicator that can communicate with an external apparatus, a user inputter such as a keyboard and a touch pad, a camera, a microphone, etc. Output data may be in various forms according to the type of an artificial intelligence model. For example, output data may be an image of which resolution has been improved, information related to an object included in an image, a text corresponding to a voice, etc. However, hereinafter, explanation will be made while being limited to a case wherein input data is an input image, for the convenience of explanation.

According to an embodiment of the disclosure, the processor 120 may perform image processing on an input image and acquires an output image. An input image and an output image may, for example, and without limitation, include standard definition (SD), high definition (HD), full HD, and ultra high definition (UHD) images, etc. For example, an output image may be an ultra high definition (UHD) image, for example, a 4K (3840×2160) image or an image having a resolution of 8K (7680×4320) or higher (e.g., 16K, 32K), but is not limited thereto. Image processing may be digital image processing including at least one of image enhancement, image restoration, image transformation, image analysis, image understanding, or image compression.

According to an embodiment of the disclosure, the processor 120 may acquire an output image by processing an input image using an artificial intelligence model. For example, for using an artificial intelligence model, the processor 120 may load information related to an artificial intelligence model stored in the memory 110 or an external memory such as a DRAM and use the information.

The processor 120 may acquire an output image by pre-processing an input image, and processing the pre-processed image using an artificial intelligence model. Pre-processing may include interpolation processing, but is not necessarily limited thereto, and may include various kinds of image processing that can improve the image quality of an input image without using an artificial intelligence model. However, hereinafter, explanation will be made based on the assumption that an input image goes through interpolation processing, for the convenience of explanation.

According to an embodiment of the disclosure, the processor 120 may perform interpolation processing on an input image, and acquire an output image which processed the interpolation-processed image using an artificial intelligence model. According to another embodiment of the disclosure, the processor 120 may acquire an output image by inputting an input image into an artificial intelligence model, in parallel with performing interpolation processing on the input image. For example, the processor 120 may perform interpolation processing using at least one interpolation technique among, for example, and without limitation, bilinear interpolation, nearest neighbor interpolation, bicubic interpolation, deconvolution interpolation, subpixel convolution interpolation, polyphase interpolation, trilinear interpolation, linear interpolation, or the like.

An artificial intelligence model may process an input image or an interpolation-processed image through an operation using a plurality of neural network layers (hereinafter, referred to as layers), and output the image. As an example, an artificial intelligence model may generate a residual image and output the image. Each of a plurality of layers may generate a residual image for an interpolation-processed image using filters including different parameters. A parameter may include, for example, the weight (or the coefficient) of a filter. In this example, an artificial intelligence model may perform an operation using various types of activation functions such as, for example, and without limitation, an identity function, a logistic Sigmoid function, a hyperbolic tangent (tanh) function, a ReLU function, a leaky ReLU function, or the like. However, an artificial intelligence model does not necessarily generate a residual image, and according to implementation examples of an artificial intelligence model, images input by various methods may be processed, and the processed images may be output.

According to an embodiment of the disclosure, the processor 120 may process an input image using one artificial intelligence model, but according to another embodiment of the disclosure, the processor 120 may process an input image using a plurality of artificial intelligence models. In this example, the plurality of artificial intelligence models may operate sequentially, or operate in parallel. As an example, the processor 120 may input an input image into a first artificial intelligence model, and input the output of the first artificial intelligence model into a second artificial intelligence model, and then acquire an output image based on an image output from the second artificial intelligence model. As another example, the processor 120 may input the input images into each of the first and second artificial intelligence models, and acquire output images based on a plurality of images output in parallel from the first and second artificial intelligence models. For example, the plurality of artificial intelligence models may include a model generating a first residual image and a model generating a second residual image. Alternatively, the plurality of artificial intelligence models may include a model for upscaling of resolutions and a model for noise reduction. The plurality of artificial intelligence models may include a model for processing of object areas or a model for processing of background areas.

The processor 120 may acquire an output image based on an image output from an artificial intelligence model, for example, a residual image and a pre-processed image, for example, an interpolation-processed image. For example, the processor 120 may sum up the pixel value included in an interpolation-processed image and the pixel value included in a residual image in a corresponding pixel unit, and acquire an output image. The processor 120 may acquire an output image based on first and second residual images respectively output from first and second artificial intelligence models and a pre-processed image. The processor 120 may acquire an output image based on a second residual image acquired by inputting a first residual image output from a first artificial intelligence model into a second artificial intelligence model, and a pre-processed image.

According to an embodiment of the disclosure, the processor 120 may identify whether a parameter (or parameters) used in any one layer among a plurality of layers included in an artificial intelligence model is a fixed parameter or a variable parameter, and provide the parameter to a first operation module or a second operation module included in the any one layer based on the identification result, and perform an operation between output data of the previous layer and the parameter. An operation module may also be referred to as an operation block, an operation unit, etc., and may be hardware implemented to perform a neural network operation of an artificial intelligence model. For example, in case an artificial intelligence model is implemented as a convolutional neural network (CNN), an operation module may be implemented as a hardware structure including at least one of a multiplier or an adder for performing a convolution filter operation. According to an embodiment of the disclosure, the first operation module may be implemented to include a relatively fewer number of multipliers compared to the second operation module, or only an adder.

A fixed parameter may include, for example, a parameter which is in common in a plurality of algorithms learned at an artificial intelligence model. A variable parameter may include, for example, a parameter varied in a plurality of algorithms. For example, in the disclosure, a parameter may include, for example, the weight value (or the coefficient) of the filter used in each layer. Accordingly, a fixed parameter may include, for example, the weight value of a filter which is in common in a plurality of algorithms, and a variable parameter may include, for example, the weight value of a filter varied in a plurality of algorithms Depending on cases, other values such as a bias value may be included in a parameter according to an embodiment of the disclosure, within a range wherein an embodiment of the disclosure can be applied.

According to an embodiment of the disclosure, if each of the first parameter acquired as the first algorithm is learned at an artificial intelligence model and the second parameter acquired as the second algorithm is learned at an artificial intelligence model is smaller than a threshold value, the processor 120 may fix the parameter of the corresponding layer as a specific parameter. A threshold value may, for example, be a predetermined value, or a value set by the processor 120. As an example, a threshold value may generally have been determined in advance as a value that does not influence an operation result in a neural network operation of an artificial intelligence model. As another example, the processor 120 may set a relative threshold value based on values of parameters acquired as each of a plurality of algorithms is learned. For example, a size of smaller than 1% among the values of the entire parameters may be determined as a threshold value.

According to another embodiment of the disclosure, if the difference between the first parameter acquired as the first algorithm is learned at an artificial intelligence model and the second parameter acquired as the second algorithm is learned at an artificial intelligence model is smaller than a threshold value, the processor 120 may fix the parameter of the corresponding layer as a specific parameter.

An operation of fixing the parameter of a random layer as a specific parameter, e.g., an operation of determining the parameter of the layer as a fixed parameter may be performed by an external apparatus or an external server which is not the processor 120, and the electronic apparatus 100 may receive the type information of each parameter from an external apparatus or an external server and store the information in the memory 110, and the processor 120 may perform a related operation using the stored information.

According to an embodiment of the disclosure, a plurality of algorithms may include different algorithms for the same purpose. As an example, a plurality of algorithms may include different algorithms for super resolution processing of an input image. An algorithm may include, for example, a collection of instructions for super resolution processing.

For example, an algorithm for super resolution processing may be a collection of various parameters used in each layer at an artificial intelligence model for super resolution processing.

Algorithms for super resolution processing may have different parameters in each neural network layer according to learning methods and learning DBs. For example, a plurality of algorithms may include different algorithms for super resolution processing such as an algorithm focused on detail processing, an algorithm focused on edge processing, an algorithm focused on blurring improvement processing, an algorithm focused on jagging improvement processing, and an algorithm focused on aliasing improvement processing. According to an embodiment of the disclosure, in case an artificial intelligence model is learned with an image of which edge is blurred and a number of images of which edges are clear respectively as an input image and output images, the parameter learned in each layer of the artificial intelligence model may be a parameter appropriate for an algorithm for edge processing.

According to an embodiment of the disclosure, in the case of a parameter which is in common in a plurality of algorithms applicable to an artificial intelligence model, the parameter can be applied as a fixed parameter in the layer even if the algorithms are changed. Thus, a complex operation is not required in a convolution operation. For example, in case a parameter of a convolution filter used in a random layer is in common in a plurality of algorithms, an operation module may be implemented using a minimum and/or reduced number of multipliers and an adder in addition to them, or an operation module may be implemented only with an adder. If an operation module is implemented using a minimum number of multipliers, the size of hardware can be reduced, and also, the cost and power consumption can be reduced.

Hereinafter, a detailed method of determining a fixed parameter according to an embodiment of the disclosure will be described.

Figure 3:
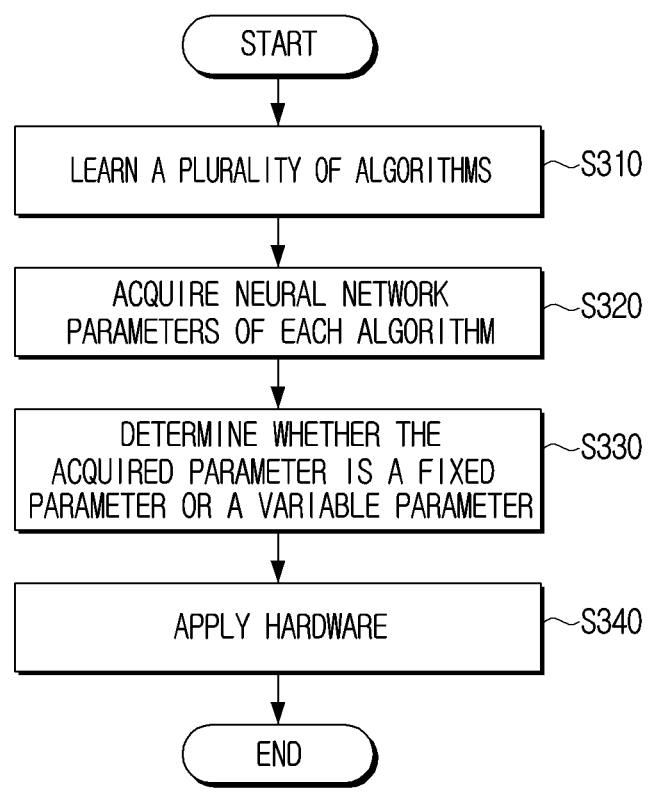
FIG. 3 is a flowchart illustrating an example method of determining the type of a neural network parameter according to an embodiment of the disclosure.

FIG. 3 is a flowchart illustrating an example method of determining the type of a neural network parameter according to an embodiment of the disclosure.

According to the flowchart illustrated in FIG. 3, the electronic apparatus 100 may learn a plurality of algorithms through an artificial intelligence model at operation S310, and may acquire neural network parameters of each algorithm at operation S320. For example, the electronic apparatus 100 may train each artificial intelligence model based on input learning data and output learning data corresponding to each of a plurality of algorithms. Accordingly, parameters corresponding to each neural network layer and channel (hereinafter, referred to as neural network parameters) may be acquired for each algorithm.

The electronic apparatus 100 may determine whether the neural network parameters acquired for each algorithm are fixed parameters or variable parameters at operation S330.

According to the determined parameter types, hardware to be included in each neural network layer may be determined at operation S340. For example, if a specific neural network layer is determined as a fixed parameter which is in common in a plurality of algorithms, the operation module of the layer may be simply implemented using a minimum number of multipliers (including 0) and an adder. This is because, in case the x value is fixed in an x*y operation, for example, in case the x value is 3, the operation becomes a 3*y operation, and thus the operation can be replaced with a shift operation using an adder such as y+y 《1 (e.g., y+2*y).

According to an embodiment of the disclosure, it may be identified whether each parameter for each of a plurality of channels of each layer included in an artificial intelligence model is a fixed parameter or a variable parameter, and the information may be stored in the memory 110. In this case, the identifying operation may be performed by the processor 120 or an external apparatus or an external server.

Figure 4:
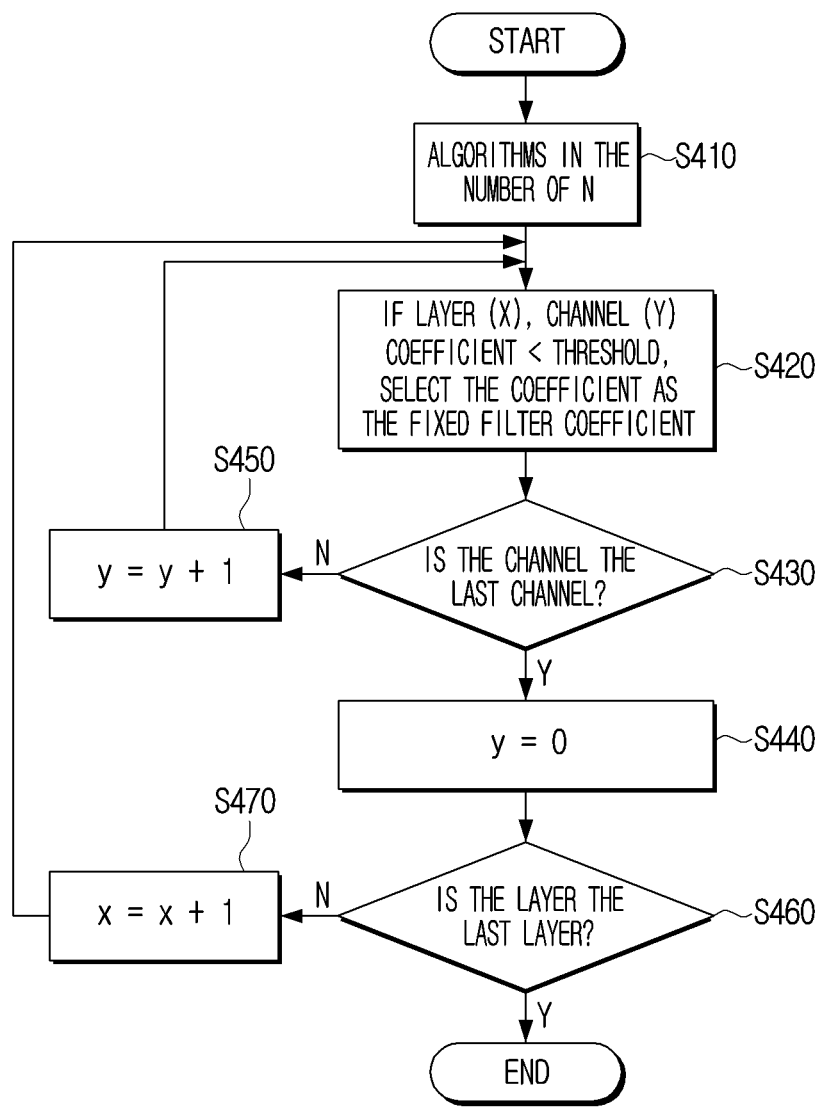
FIG. 4 is a flowchart illustrating an example method of determining the type of a neural network parameter according to an embodiment of the disclosure.

FIG. 4 is a flowchart illustrating an example method of determining the type of a neural network parameter according to an embodiment of the disclosure.

According to FIG. 4, for determining the types of neural network parameters of a plurality of algorithms, e.g., algorithms S410 in the N number, if the current channel y coefficient of the current layer x is smaller than a threshold value, the coefficient is selected as a fixed filter coefficient at operation S420.

If the current channel is the last channel S430:Y, that is, y=0 (S440), it is identified whether the current layer is the last layer at operation S460.

If the current channel is not the last channel S430:N, selecting the type of the filter coefficient of the next channel y=y+1 proceeds at operation S450.

If the current layer is not the last layer S470:N at operation S460, selecting the type of the filter coefficient of the next layer x=x+1 proceeds at operation S470. If the current layer is the last layer at operation S460, the proceeding may end.

By the aforementioned method, the types of filter coefficients corresponding to all channels of all layers may be determined. For example, in case the filter coefficient corresponding to the channel 1 of the layer 1 is smaller than a threshold value in all of the plurality of algorithms, the filter coefficient corresponding to the channel 1 of the layer 1 may be determined as a fixed filter coefficient. Accordingly, the filter coefficient corresponding to the channel 1 of the layer 1 may be determined as a common filter coefficient corresponding to all of the plurality of algorithms and fixed. For example, a fixed filter coefficient may be determined as one of a specific value smaller than a threshold value (e.g., 0, 0.01, etc.), the average value, the minimum value, and the maximum value of each filter coefficient. This is for reducing the cost and the power consumption in a case wherein the filter coefficient of a specific channel in all of a plurality of algorithms is a coefficient smaller than a threshold value which does not greatly influence an operation result, by implementing the structure of the hardware, e.g., the operation module of the channel to be simple by fixing the filter coefficient of the channel and reducing the size of the hardware. By the same method as above, it may be determined whether filter coefficients corresponding to all channels of all layers are fixed filter coefficients or variable filter coefficients.

In the embodiment illustrated in FIG. 4, a case wherein, if each filter coefficient corresponding to a specific channel of a specific layer acquired in each of a plurality of algorithms is smaller than a threshold value, the filter coefficient of the channel is determined as a common filter coefficient, e.g., a fixed filter coefficient was described, but the disclosure is not necessarily limited thereto. As another example, in case the difference among filter coefficients corresponding to specific channels of specific layers acquired in each of a plurality of algorithms is smaller than a threshold value, the filter coefficient of the channel may be determined as a common filter coefficient, e.g., a fixed filter coefficient. For example, a fixed filter coefficient may be determined as one of the average value, the minimum value, and the maximum value of each filter coefficient.

In the aforementioned embodiment, it was described that learning for a plurality of algorithms is performed at the electronic apparatus 100, but according to another embodiment of the disclosure, learning for a plurality of algorithms is performed at an external apparatus or an external server and the electronic apparatus 100 may receive information on algorithms already learned, e.g., parameter information of an artificial intelligence model related to the plurality of algorithms. As an example, the electronic apparatus 100 may receive parameter information related to the plurality of algorithms from an external apparatus or an external server and determine whether the parameters of each algorithm are fixed parameters or variable parameters. As another example, the electronic apparatus 100 may not only receive parameter information related to the plurality of algorithms but also information on whether the parameters of each algorithm are fixed parameters or variable parameters from an external apparatus or an external server.

Figure 5:
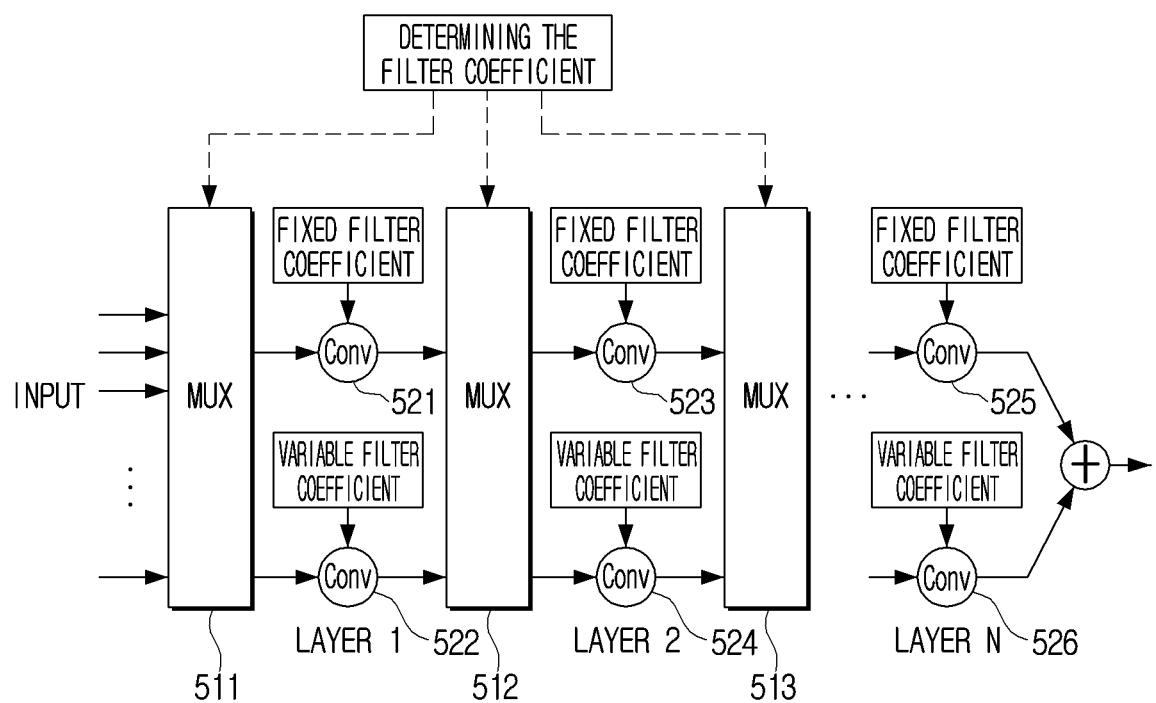
FIG. 5 is a diagram illustrating an example method of providing to an operation module according to the type of a neural network parameter of each layer according to an embodiment of the disclosure.
Figure 6:
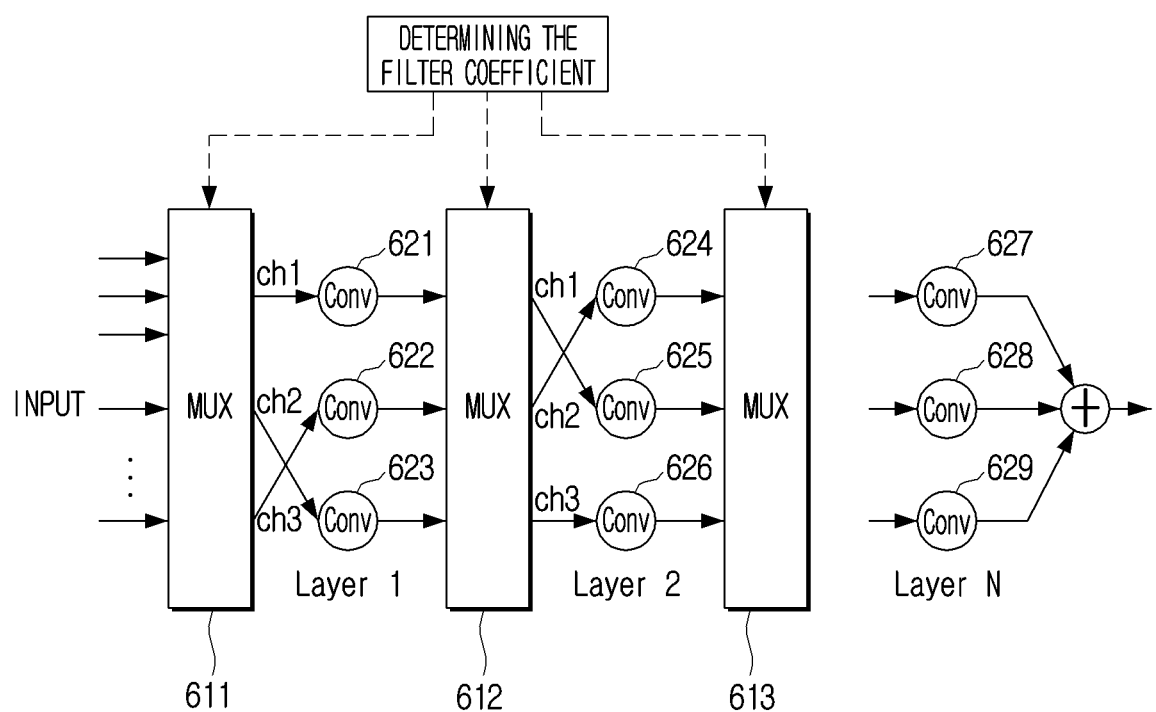
FIG. 6 is a diagram illustrating an example method of providing to an operation module according to the type of a neural network parameter of each layer according to an embodiment of the disclosure.

FIGS. 5 and 6 are diagrams illustrating an example method of providing to an operation module according to the type of a neural network parameter of each layer according to an embodiment of the disclosure.

According to FIG. 5, on the front end of each layer of an artificial intelligence model according to an embodiment of the disclosure, muxes 511, 512, 513 for selectively providing each filter coefficient to the operation modules 521, 522, 524, 524, 525 and 526 included in each layer may be provided. Each layer included in the artificial intelligence model may be implemented as software, hardware, or a combination of software and hardware. Each operation module may be implemented as hardware including, for example, and without limitation, at least one of a multiplier, an adder, or the like, and the muxes (multiplexers) may also be implemented as hardware, e.g., a combined circuit.

According to FIG. 5, in case an artificial intelligence model corresponding to a specific algorithm is executed, the processor 120 may provide the filter coefficient of each layer corresponding to the algorithm to each layer. In this example, the processor 120 may identify whether the filter coefficient of each channel of each layer is a fixed filter coefficient or a variable filter coefficient, and control the muxes 511, 512, 513 based on the identification result. For example, in case the filter coefficient of the channel 1 of the layer 1 is a fixed filter coefficient, the processor 120 may provide the filter coefficient to the first operation module 521, and in case the filter coefficient of the channel 1 of the layer 2 is a fixed filter coefficient, the processor 120 may control the first mux 511 to provide the filter coefficient to the second operation module 522. The second operation module 522 may be implemented in a form wherein the number of multipliers is relatively smaller than the first operation module 521.

FIG. 6 is a diagram illustrating an example method of providing illustrated in FIG. 5 in greater detail.

According to FIG. 6, on the front end of each layer of an artificial intelligence model according to an embodiment of the disclosure, muxes 611, 612, 613 for selectively providing each filter coefficient to the operation modules 621, 622, 623, 624, 625, 626, 627, 628 and 629 (which may be referred to hereinafter as operation modules 621 to 629) included in each layer may be provided.

According to an embodiment of the disclosure, it will be assumed that some operation modules 622, 625, 628 among the plurality of operation modules 621 to 619 are modules provided for an operation of a fixed filter coefficient. In this example, the processor 120 may identify whether the filter coefficient of each channel of each layer is a fixed filter coefficient or a variable filter coefficient, and control the muxes 611, 612, 613 based on the identification result. For example, in case the filter coefficient of the third channel ch3 of the layer 1 is a fixed filter coefficient, the processor 120 may control the first mux 611 such that the filter coefficient is provided to the module 622 provided for an operation of a fixed filter coefficient among the plurality of operation modules 621, 622, 623 included in the layer 1. Also, in case the filter coefficient of the first channel ch1 of the layer 2 is a fixed filter coefficient, the processor 120 may control the second mux 612 such that the filter coefficient is provided to the module 625 provided for an operation of a fixed filter coefficient among the plurality of operation modules 624, 625, 626 included in the layer 2.

Figure 7:
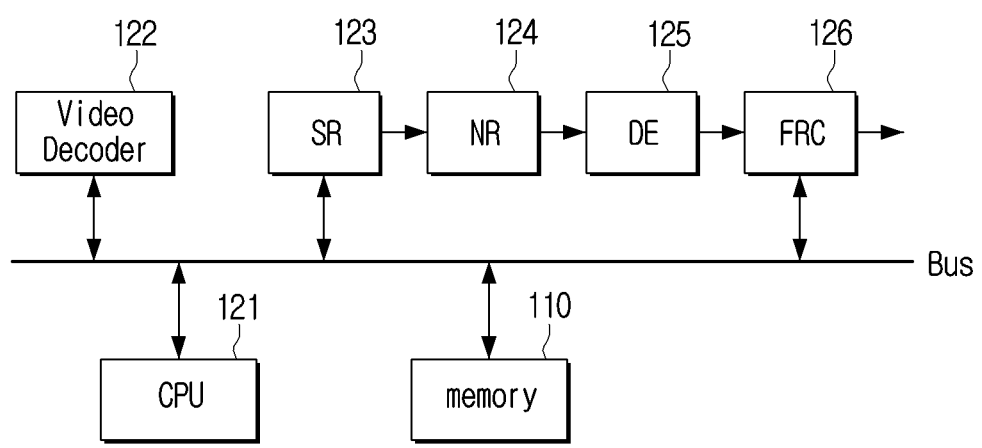
FIG. 7 is a block diagram illustrating an example hardware configuration of an electronic apparatus according to an embodiment of the disclosure.

FIG. 7 is a block diagram illustrating an example hardware configuration of an example electronic apparatus according to an embodiment of the disclosure.

FIG. 7 is a block diagram illustrating an example configuration of a processor chip according to an embodiment of the disclosure, and a processor chip may include an IP for various kinds of processing. The IP may refer, for example, to a function block that is reusable and it may be a hardware or software function block or may be a combination thereof. Hereinafter, explanation will be made based on the assumption that an IP is implemented as a hardware IP, for the convenience of explanation.

For example, a processing chip for image processing may be implemented such that the hardware IPs of the memory 110, the CPU 121, the video decoder 122, the SR 123, the NR 124, the DE 125, and the FRC 126 are connected through a bus, as illustrated in FIG. 7. Here, the SR 123 may be a hardware IP for super resolution processing, the NR 124 may be a hardware IP for nose reduction processing, the DE 125 may be a hardware IP for detail enhancement processing, and the FRC 126 may be a hardware IP for frame rate conversion.

In case an artificial intelligence model according to an embodiment of the disclosure is implemented to execute a plurality of algorithms for the same purpose of a super resolution, components such as an operation module, a mux, etc. according to an embodiment of the disclosure may be included in the SR 123. For example, the CPU 121 may control the operation of the SR 123 based on information related to neural network parameters corresponding to each of a plurality of algorithms stored in the memory 110. However, the disclosure is not limited thereto, and the operation of the SR 123 can be controlled by another processor such as an NPU.

According to another embodiment of the disclosure, various hardware IPs included in a processor chip may be implemented as at least one software, or a combination of at least one software and at least one hardware. For example, a logic corresponding to some functions of the video decoder 122 may be implemented in the video decoder 122, and a logic corresponding to the other functions may be implemented as software executable by a CPU.

Figure 8:
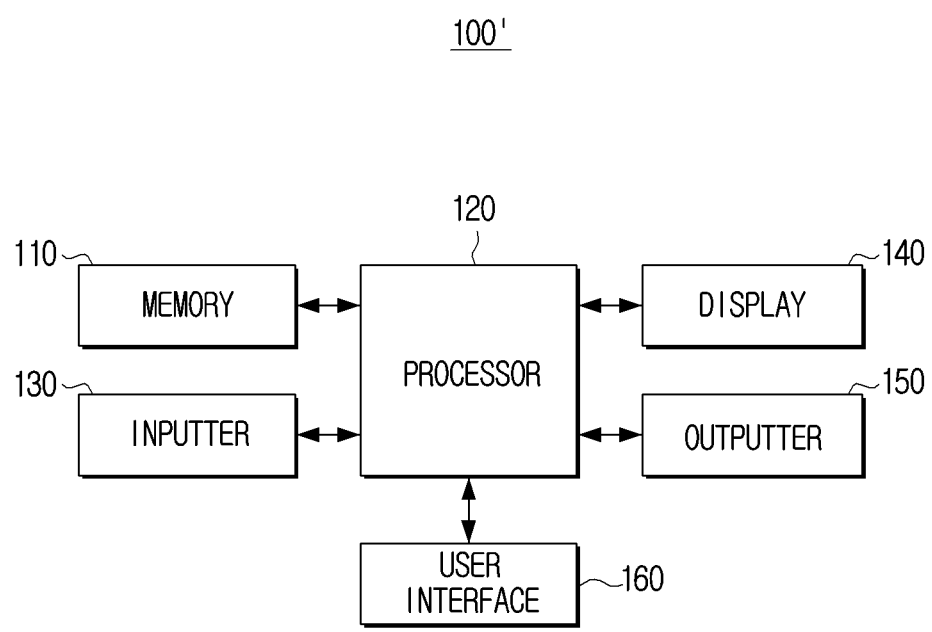
FIG. 8 is a block diagram illustrating an example electronic apparatus according to an embodiment of the disclosure.

FIG. 8 is a block diagram illustrating an example electronic apparatus according to an embodiment of the disclosure.

According to FIG. 8, the electronic apparatus 100' includes a memory 110, a processor (e.g., including processing circuitry) 120, an inputter (e.g., including input circuitry) 130, a display 140, an outputter (e.g., including output circuitry) 150, and a user interface 160. Among the components illustrated in FIG. 10, regarding the components overlapping with the components illustrated in FIG. 2, detailed explanation may not be repeated here.

The processor 120 may include various processing circuitry and perform additional pre-processing before interpolation processing of an input image, depending on cases. According to an embodiment of the disclosure, the processor 120 may additionally perform pre-filtering of removing noises of an input image. For example, prominent noises may be removed by applying a smoothing filter like a Gaussian filter, a guided filter filtering an input image by comparing it with a predetermined guidance, etc.

The inputter 130 may include various input circuitry and receives inputs of various types of contents. For example, the inputter 130 may receive input of an image signal by a streaming or downloading method from an external apparatus (e.g., a source apparatus), an external storage medium (e.g., a USB memory), an external server (e.g., a web hard), etc. through communication methods such as Wi-Fi based on AP (Wi-Fi, a wireless LAN network), Bluetooth, Zigbee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), optical, and coaxial. Here, an image signal may be a digital image signal among one of a standard definition (SD) image, a high definition (HD) image, a full HD image, or an ultra HD image, but is not limited thereto.

The display 140 may be implemented as a display including self-emitting diodes or a display including non-self-emitting diodes and a backlight. For example, the display 140 may be implemented as various forms of displays such as, for example, and without limitation, a liquid crystal display (LCD), an organic light emitting diodes (OLED) display, a light emitting diodes (LED) display, a micro LED, a mini LED, a plasma display panel (PDP), a quantum dot (QD) display, a quantum dot light-emitting diodes (QLED) display, or the like. In the display 140, driving circuits that may be implemented in forms such as an a-si TFT, a low temperature poly silicon (LTPS) TFT, an organic TFT (OTFT), etc., a backlight unit, etc. may also be included. Meanwhile, the display 140 may be implemented as a touch screen combined with a touch sensor, a flexible display, a rollable display, a 3D display, a display to which a plurality of display modules are physically connected, etc. The processor 120 may control the display 140 to output the output images acquired according to the aforementioned various embodiments. Here, an output image may be a high resolution image of greater than or equal to 4K or 8K.

The outputter 150 may include various output circuitry and outputs acoustic signals. For example, the outputter 150 may convert a digital acoustic signal processed at the processor 120 into an analog acoustic signal and amplify the signal, and output the signal. For example, the outputter 150 may include at least one speaker unit, a D/A converter, an audio amplifier, etc. that may output at least one channel According to an embodiment of the disclosure, the outputter 150 may be implemented to output various multi-channel acoustic signals. In this case, the processor 120 may control the outputter 150 to perform enhancement processing on an input acoustic signal to correspond to the enhancement processing of the input image and output the signal. For example, the processor 120 may convert an input two-channel acoustic signal into a virtual multi-channel (e.g., a 5.1 channel) acoustic signal, or recognize the location wherein the electronic apparatus 100' is placed and process the signal as a stereoscopic acoustic signal optimized for the space, or provide an acoustic signal optimized according to the type (e.g., the content genre) of the input image.

The user interface 160 may include various user interface circuitry and may be implemented as an apparatus such as a button, a touch pad, a mouse, and a keyboard, or implemented as a touch screen, a remote control transceiver, etc. that can perform a manipulation input function as well as the aforementioned display function. The remote control transceiver may receive a remote control signal from an external remote control apparatus through at least one communication method among infrared communication, Bluetooth communication, or Wi-Fi communication, or transmit a remote control signal.

The electronic apparatus 100' may additionally include a tuner and a demodulation part depending on implementation examples. A tuner (not shown) may tune a channel selected by a user or all pre-stored channels among radio frequency (RF) broadcasting signals received through an antenna and receive an RF broadcasting signal. A demodulation part (not shown) may receive a digital IF (DIF) signal converted at a tuner and demodulate the signal, and perform channel decoding, etc. According to an embodiment of the disclosure, an input image received through a tuner may be processed through a demodulation part (not shown), and then provided to the processor 120 for image processing according to an embodiment of the disclosure.

Figure 9:
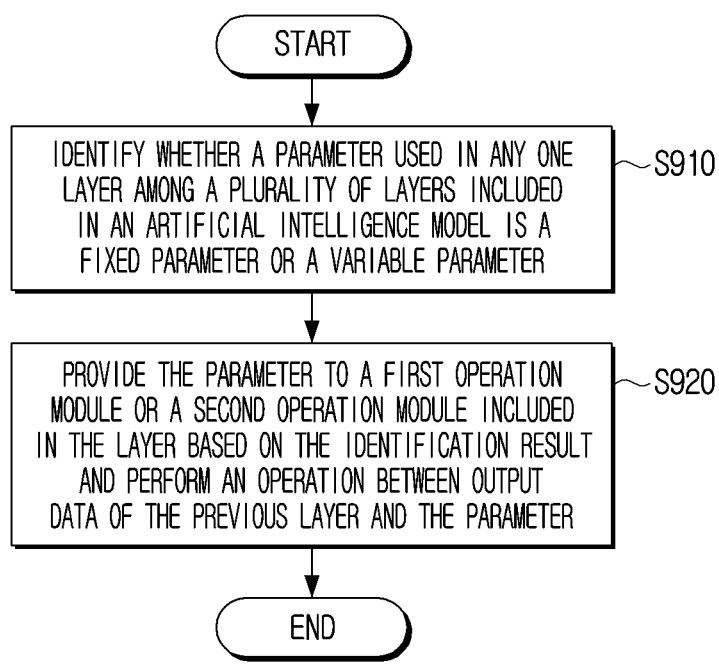
FIG. 9 is a flowchart illustrating an example method of controlling an electronic apparatus according to an embodiment of the disclosure.

FIG. 9 is a flowchart illustrating an example method of controlling an electronic apparatus according to an embodiment of the disclosure.

According to the control method of an electronic apparatus storing information on an artificial intelligence model including a plurality of layers illustrated in FIG. 9, it is identified whether a parameter used in any one layer among a plurality of layers included in an artificial intelligence model is a fixed parameter or a variable parameter at operation S910.

Based on the identification result, the parameter is provided to the first operation module or the second operation module included in the any one layer and an operation between output data of the previous layer and the parameter is performed at operation S920.

A fixed parameter may be a parameter which is in common in a plurality of algorithms learned at an artificial intelligence model, and a variable parameter may be a parameter which is varied in a plurality of algorithms. The first operation module may be implemented to include a relatively fewer number of multipliers compared to the second operation module, or only an adder.

The plurality of algorithms may include different algorithms for super resolution processing of an input image.

In addition, the method may further include an operation of, based on a first parameter acquired as a first algorithm is learned at the artificial intelligence model and a second parameter acquired as a second algorithm is learned at the artificial intelligence model respectively being smaller than a threshold value, fixing the parameter of the any one layer as a specific parameter. Here, the first parameter and the second parameter may be parameters corresponding to the any one layer.

The control method may further include an operation of, based on the difference between a first parameter acquired as a first algorithm is learned at the artificial intelligence model and a second parameter acquired as a second algorithm is learned at the artificial intelligence model being smaller than a threshold value, fixing the parameter of the any one layer as a specific parameter. The first parameter and the second parameter may be parameters corresponding to the any one layer.

At operation S910, it may be identified whether each parameter for each of a plurality of channels applied in any one layer is a fixed parameter or a variable parameter. In this example, at operation S920, each parameter for each of a plurality of channels may be provided to the first operation module or the second operation module based on the identification result and an operation between output data of the previous layer and the parameter of the layer may be performed.

In addition, information on an artificial intelligence model may include parameters used in each of a plurality of layers included in an artificial intelligence model and identification information indicating whether the parameters are fixed parameters or variable parameters. In this example, at operation S910, it may be identified whether a parameter is a fixed parameter or a variable parameter based on identification information corresponding to a parameter used in any one layer.

An artificial intelligence model may include muxes located on the front end of each of a plurality of layers. In this example, at operation S920, the muxes may be controlled such that a parameter is provided to the first operation module or the second operation module based on the identification result.

A parameter used in any one layer may include the coefficients of filters applied to each channel in the any one layer.

According to the aforementioned various embodiments of the disclosure, an operation module for a neural network operation can be implemented with little hardware resource, and thus the size of hardware can be reduced. By virtue of simplification of hardware, the cost for implementation of hardware can be reduced, and the power consumption can be reduced. For example, in the case of implementing a neural network for real-time processing as hardware, the size of the hardware can be reduced by simplifying a multiplier operator, and the cost and the power consumption can be effectively reduced.

The various embodiments of the disclosure may be applied not only to display apparatuses, but also to all electronic apparatuses that can perform image processing such as an image receiving apparatus like a set-top box, an image processing apparatus, etc. It is possible that the aforementioned various embodiments of the disclosure can be performed through an embedded server provided on an electronic apparatus, or an external server of an image processing apparatus.

Methods according to the aforementioned various embodiments of the disclosure may be implemented in the form of an application or software that can be installed on conventional electronic apparatuses.

Methods according to the aforementioned various embodiments of the disclosure may be implemented with software upgrade, or hardware upgrade of conventional electronic apparatuses.

According to an embodiment of the disclosure, the various embodiments described above may be implemented as software including instructions stored in machine-readable storage media, which can be read by machines (e.g., computers). The machines may refer, for example, to apparatuses that call instructions stored in a storage medium, and can operate according to the called instructions, and the apparatuses may include an image processing apparatus (e.g.: an image processing apparatus A) according to the embodiments described in the disclosure. In case an instruction is executed by a processor, the processor may perform a function corresponding to the instruction by itself, or using other components under its control. An instruction may include a code generated by a compiler or a code executable by an interpreter. A storage medium that is readable by machines may be provided in the form of a non-transitory storage medium. The 'non-transitory' storage medium may not include signals, and is tangible, but does not indicate whether data is stored in the storage medium semi-permanently or temporarily.

According to an embodiment of the disclosure, methods according to the aforementioned various embodiments may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g, Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g., a module or a program) may include a singular object or a plurality of objects. Also, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order or omitted, or other operations may be added.

While various example embodiments of the disclosure have been illustrated and described, the disclosure is not limited to the aforementioned example embodiments, and it is apparent that various changes in form and detail may be made by those having ordinary skill in the art, without departing from the true spirit and full scope of the disclosure, including the appended claims.

What is claimed is:

1. An electronic apparatus comprising:
a display;
a memory storing information on an artificial intelligence model including a plurality of layers; and
a processor configured to:
  acquire a pre-processed image by pre-processing an input image,
  acquire a residual image by inputting the pre-processed image to the artificial intelligence model,
  acquire an output image by summing up a pixel value included in the pre-processed image and a pixel value included in the residual image in a corresponding pixel unit, and
  control the display to display the output image,
wherein the processor is further configured to:
  identify, for each of a plurality of channels of each layer in the plurality of layers included in the artificial intelligence model, whether a parameter of the channel is a fixed parameter or a variable parameter,
  provide the parameters to operation modules in the respective layers, wherein each layer of the plurality of layers includes a first operation module and a second operation module, wherein the first operation module is implemented to include a relatively fewer number of multipliers than the second operation module, the parameters identified as the fixed parameter are provided to one of the first operation modules and the parameters identified as the variable parameter are provided to one of the second operation modules, and perform an operation based on the parameters provided to the first operation modules and the second operation modules in the plurality of layers.

2. The electronic apparatus of claim 1,
wherein the fixed parameter includes a parameter in common in a plurality of algorithms learned at the artificial intelligence model, and
the variable parameter includes a parameter varied in the plurality of algorithms.

3. The electronic apparatus of claim 2,
wherein the plurality of algorithms include different algorithms for super resolution processing of the input image.

4. The electronic apparatus of claim 1,
wherein the processor is configured to:
based on a first parameter acquired as a first algorithm being learned at the artificial intelligence model and a second parameter acquired as a second algorithm being learned at the artificial intelligence model being smaller than a threshold value, fix the parameter of any one layer of the plurality of layers as a specific parameter, and
the first parameter and the second parameter are parameters corresponding to the any one layer.

5. The electronic apparatus of claim 1,
wherein the processor is configured to:
based on the difference between a first parameter acquired as a first algorithm being learned at the artificial intelligence model and a second parameter acquired as a second algorithm being learned at the artificial intelligence model being smaller than a threshold value, fix the parameter of any one layer of the plurality of layers as a specific parameter, and
the first parameter and the second parameter are parameters corresponding to the any one layer.

6. The electronic apparatus of claim 1,
wherein the processor is configured to:
identify whether each parameter for each of the plurality of channels applied at any one layer of the plurality of layers is a fixed parameter or a variable parameter, and
provide each parameter for each of the plurality of channels to the first operation module or the second operation module based on the identification.

7. The electronic apparatus of claim 1,
wherein information on the artificial intelligence model includes identification information indicating whether parameters used in each of the plurality of layers are fixed parameters or variable parameters, and
the processor is configured to:
identify whether the parameter is the fixed parameter or the variable parameter based on identification information corresponding to the parameter used in any one layer of the plurality of layers.

8. The electronic apparatus of claim 1,
wherein the artificial intelligence model includes a plurality of muxes located at front ends of each of the plurality of layers, and the processor is configured to:
control a mux located on the front end of the any one layer to provide the parameters to the first operation module or the second operation module based on the identification.

9. The electronic apparatus of claim 1,
wherein the parameter used in any one layer of the plurality of layers includes coefficients of filters applied to each channel in the any one layer.

10. The electronic apparatus of claim 1, further comprising:
a display,
wherein the processor is configured to:
control the display to output the output image, and
the output image comprises a high resolution image greater than or equal to 4K or 8K.

11. A method of controlling an electronic apparatus storing information on an artificial intelligence model including a plurality of layers, the method comprising:
acquiring a pre-processed image by pre-processing an input image;
acquiring a residual image by inputting the pre-processed image to the artificial intelligence model;
acquiring an output image by summing up a pixel value included in the pre-processed image and a pixel value included in the residual image in a corresponding pixel unit; and
displaying the output image;
wherein the method further comprises:
identifying, for each of a plurality of channels of each layer in the plurality of layers included in the artificial intelligence model, whether a parameter of the channel is a fixed parameter or a variable parameter;
providing the parameters to operation modules in the respective layers, wherein each layer of the plurality of layers includes a first operation module and a second operation module, wherein the first operation module is implemented to include a relatively fewer number of multipliers than the second operation module, the parameters identified as the fixed parameter are provided to one of the first operation modules and the parameters identified as the variable parameter are provided to one of the second operation modules; and
performing an operation based on the parameters provided to the first operation modules and the second operation modules in the plurality of layers.

12. The method of claim 11,
wherein the fixed parameter includes a parameter in common in a plurality of algorithms learned at the artificial intelligence model, and
the variable parameter includes a parameter varied in the plurality of algorithms.

13. The method of claim 12,
wherein the plurality of algorithms include different algorithms for super resolution processing of an input image.

14. The method of claim 11, further comprising:
based on a first parameter acquired as a first algorithm being learned at the artificial intelligence model and a second parameter acquired as a second algorithm being learned at the artificial intelligence model being smaller than a threshold value, fixing the parameter of any one layer of the plurality of layers as a specific parameter,
wherein the first parameter and the second parameter are parameters corresponding to the any one layer.

15. The method of claim 11, further comprising:
based on the difference between a first parameter acquired as a first algorithm being learned at the artificial intelligence model and a second parameter acquired as a second algorithm being learned at the artificial intelligence model being smaller than a threshold value, fixing the parameter of any one layer of a plurality of layers as a specific parameter,
wherein the first parameter and the second parameter are parameters corresponding to the any one layer.

16. The method of claim 11,
wherein the identifying comprises:
identifying whether each parameter for each of the plurality of channels applied at any one layer of the plurality of layers is a fixed parameter or a variable parameter, and
the performing an operation between output data of a previous layer of the any one layer and the parameter comprises:
providing each parameter for each of the plurality of channels to the first operation module or the second operation module based on the identification and performing an operation between output data of the previous layer and the parameter.

17. The method of claim 11,
wherein information on the artificial intelligence model includes identification information indicating whether parameters used in each of the plurality of layers are fixed parameters or variable parameters, and
the identifying comprises:
identifying whether the parameter is the fixed parameter or the variable parameter based on identification information corresponding to the parameter used in any one layer of the plurality of layers.

18. The method of claim 11,
wherein the artificial intelligence model includes a plurality of muxes located at front ends of each of the plurality of layers, and
the performing an operation between output data of a previous layer and the parameter comprises:
controlling a mux located on the front end of the any one layer to provide the parameters to the first operation module or the second operation module based on the identification.

19. The method of claim 11,
wherein the parameter used in any one layer of the plurality of layers includes coefficients of filters applied to each channel in the any one layer.

20. A non-transitory computer-readable recording medium having stored thereon computer instructions which, when executed by a processor of an electronic apparatus storing information on an artificial intelligence model including a plurality of layers, cause the electronic apparatus perform operations comprising:
acquiring a pre-processed image by pre-processing an input image;
acquiring a residual image by inputting the pre-processed image to the artificial intelligence model;
acquiring an output image by summing up a pixel value included in the pre-processed image and a pixel value included in the residual image in a corresponding pixel unit;
displaying the output image;
identifying, for each of a plurality of channels of each layer in the plurality of layers included in the artificial intelligence model, whether a parameter of the channel is a fixed parameter or a variable parameter;
providing the parameters to operation modules in the respective layers, wherein each layer of the plurality of layers includes a first operation module and a second operation module, wherein the first operation module is implemented to include a relatively fewer number of multipliers than the second operation module, the parameters identified as the fixed parameter are provided to one of the first operation modules and the parameters identified as the variable parameter are provided to one of the second operation modules; and
performing an operation based on the parameters provided to the first operation modules and the second operation modules in the plurality of layers.

* * * * *